(12) United States Patent
Honegger et al.

(10) Patent No.: US 7,155,938 B2
(45) Date of Patent: Jan. 2, 2007

(54) METHOD AND DEVICE FOR LOADING A GLASS PROCESSING INSTALLATION

(75) Inventors: Rolf Honegger, Zofingen (CH); Hans Gfeller, Aarwangen (CH)

(73) Assignee: Bystronic Maschinen AG, Buetzberg (CH)

( * ) Notice: Subject to any disclaimer, the term of this patent is extended or adjusted under 35 U.S.C. 154(b) by 0 days.

(21) Appl. No.: 10/730,015

(22) Filed: Dec. 9, 2003

(65) Prior Publication Data

US 2004/0118160 A1    Jun. 24, 2004

(30) Foreign Application Priority Data

Dec. 19, 2002    (CH) .................................... 2168/02

(51) Int. Cl.
*C03B 21/00*    (2006.01)

(52) U.S. Cl. ............ 65/105; 65/174; 65/111; 65/112; 65/166; 209/542; 209/552; 83/6; 83/100; 83/266; 83/417; 225/96; 225/2; 225/94

(58) Field of Classification Search .................. 65/105, 65/174, 112; 83/6, 417, 879, 99, 100, 266, 83/268; 225/96, 2, 94; 209/542, 552
See application file for complete search history.

(56) References Cited

U.S. PATENT DOCUMENTS 4,277,889 A * 7/1981 Oberg ..................... 30/164.95
4,871,104 A    10/1989 Cassese
5,511,671 A    4/1996 Zumstein
5,873,922 A * 2/1999 Lisec ......................... 65/112
2003/0127484 A1    7/2003 Wirsam

FOREIGN PATENT DOCUMENTS

| | | |
|---|---|---|
| DE | 196 00 348 A1 | 7/1997 |
| DE | 19600348 * | 7/1997 |
| EP | 0 274 962 A1 | 7/1988 |
| EP | 1 319 634 A1 | 6/2003 |
| FR | 2 574 392 A1 | 6/1986 |
| WO | WO 95/25688 A1 | 9/1995 |

* cited by examiner

*Primary Examiner*—Mark Halpern
(74) *Attorney, Agent, or Firm*—Foley & Lardner LLP

(57) ABSTRACT

In the method for loading a glass processing installation (5) with loading portions (10*a*), glass plates (10, 10*b*) are extracted repeatedly from a storage unit (20) in a predetermined sequence and divided into a residual portion (10*b*), which is stored in the storage unit, and a loading portion (10*a*), which is delivered to the glass processing installation. It is thereby possible to selectively load the glass processing unit with portions of glass plates of certain dimensions and of a determined sort. The device for loading a glass processing installation comprises a storage unit (20) with at least two compartments (21), each compartment being capable of receiving at least one glass plate (10, 10*b*), and displacing means for displacing a glass plate in a compartment at least partially out of the compartment.

20 Claims, 5 Drawing Sheets

METHOD AND DEVICE FOR LOADING A GLASS PROCESSING INSTALLATION

FIELD OF THE INVENTION

The invention relates to a method for loading a glass processing installation and to a device for loading a glass processing installation.

BACKGROUND OF THE INVENTION

In known methods and devices for loading a glass processing installation, the glass plates are extracted from the storage space, delivered to the glass processing installation in an undivided state, and then for example divided to the desired sizes. The production often requires e.g. producing glass plates of different types in a certain sequence or producing a determined number of glass plates of the same type. In the production of insulating glass pane, for example, a coated glass pane is joined with an uncoated glass pane, the panes having previously been cut to the desired size from respective glass plates. However, since the glass plates are delivered to the glass processing installation in its entirety, the separated glass plates have to be sorted accordingly resp. temporarily stored. This is complicated as it requires corresponding installations for handling and intermediate storage of the glass plates. Another drawback of the methods and devices of the prior art is that e.g. in the production of a small number of glass plates of a given dimension, only a part of a whole glass plate is needed, such that the remainder of the glass plate ("residual sheet") must be removed from the production line and temporarily stored for future processing. However, the handling, storage, and management of residual sheets are relatively complicated.

SUMMARY OF THE INVENTION

It is an object of the present invention to provide an improved method for loading a glass processing installation and an improved device therefor, which method and device do not have the above-mentioned drawbacks.

According to a first aspect of the invention this object is attained by a method, wherein glass plates are stored in a storage unit, and wherein glass plates are repeatedly extracted at least partially from the storage unit and divided into a loading portion and a residual portion, which is stored in the storage unit, such that loading portions are delivered to the glass processing installation in a predetermined sequence.

According to a second aspect of the invention there is provided a device which comprises a storage unit with at least two compartments, each compartment being capable of receiving at least one glass plate, and displacing means for displacing a glass plate in a compartment at least partially out of the compartment.

The invention is based on the finding that the handling and the management of the glass material within a glass processing installation can be substantially simplified if the latter is supplied with parts of glass plates rather than entire glass plates. Thus, the method of the invention and the device of the invention offer the advantage of allowing a glass processing installation to be selectively supplied with glass plates of certain dimensions and certain sorts.

BRIEF DESCRIPTION OF THE DRAWINGS

The invention shall be explained in more detail hereinafter by means of exemplifying embodiments and with reference to figures, where.

DETAILED DESCRIPTION OF PREFERRED EMBODIMENTS

Figure 1:
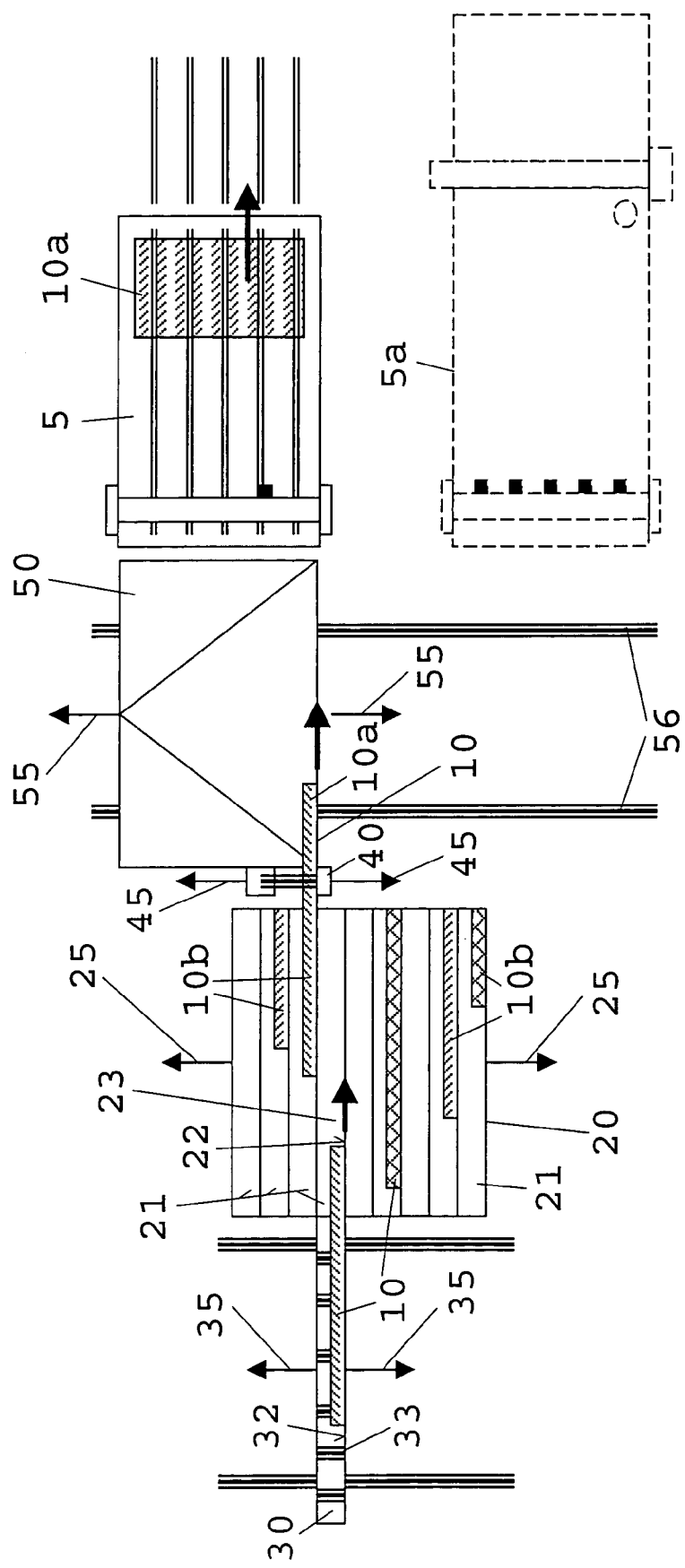
FIG. 1 shows a schematic top view of the loading device.

FIG. 1 schematically shows the basic structure of a loading device. The latter comprises a storage unit 20 with a number of compartments 21, each compartment 21 being capable of receiving a glass plate 10 to be processed. For supporting the glass plates 10 in an essentially vertical position, each compartment 21 comprises a supporting surface 22 extending correspondingly vertically. Typically, the angle enclosed between a respective supporting surface 22 and the vertical direction is comprised in a range of 0 to 10 degrees. Since, for reasons of space, the glass plates are usually stored in the storage space essentially vertically as well, they can be moved from the storage space to storage unit 20 without tilting. This is particularly advantageous in the case of large glass plates as their handling is difficult on account of their weight and their dimensions. Typically, glass plates having a side face of 600 cm×321 cm and a weight of up to one ton are processed in glass cutting installations.

Figure 5:
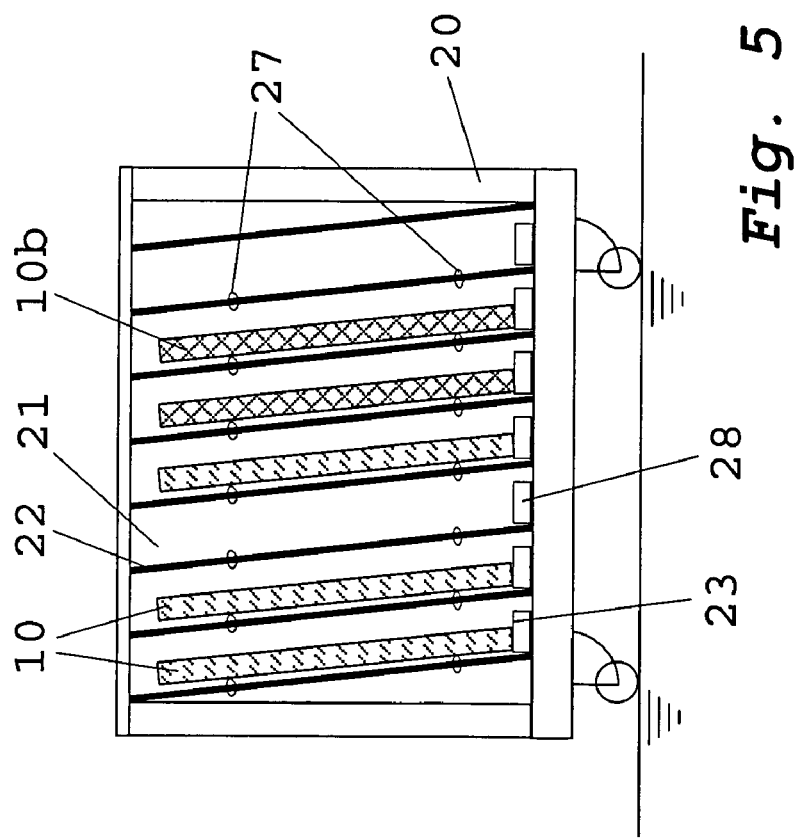
FIG. 5 shows a storage unit of the device according to FIG. 1 in a side view.

Supporting surfaces 22 are provided with gliding means, e.g. in the form of rollers, an air cushion, and/or a felt covering, such that glass plate 10 may glide along supporting surface 22 without being scratched or otherwise damaged thereby. (Cf. FIG. 5 showing the gliding means 27.) Each compartment 21 comprises another supporting surface in the form of rest surface 23 on which one of the edges of glass plate 10 is resting.

For displacing a glass plate 10 along supporting surface 22, rest surface 23 comprises displacing means e.g. in the form of a driven conveyor belt. (Cf. FIG. 5 showing the displacing means 28.) Alternatively, it is also possible to provide resting surface 23 with gliding means such as rollers, thereby allowing glass plate 10 to glide thereon and to be displaced by displacing means such as grippers or a pushing element. The displacing means serve the purpose of moving a glass plate 10 along compartment 21 in either direction. Thus, a glass plate 10 can be selectively discharged on one of the sides of storage unit 20 and moved out of the compartment at least partially, e.g. for dividing the glass plate 10. After completing the operation, the remainder 10b of the glass plate 10 is moved back into compartment 21 by means of the displacing means.

Figure 2:
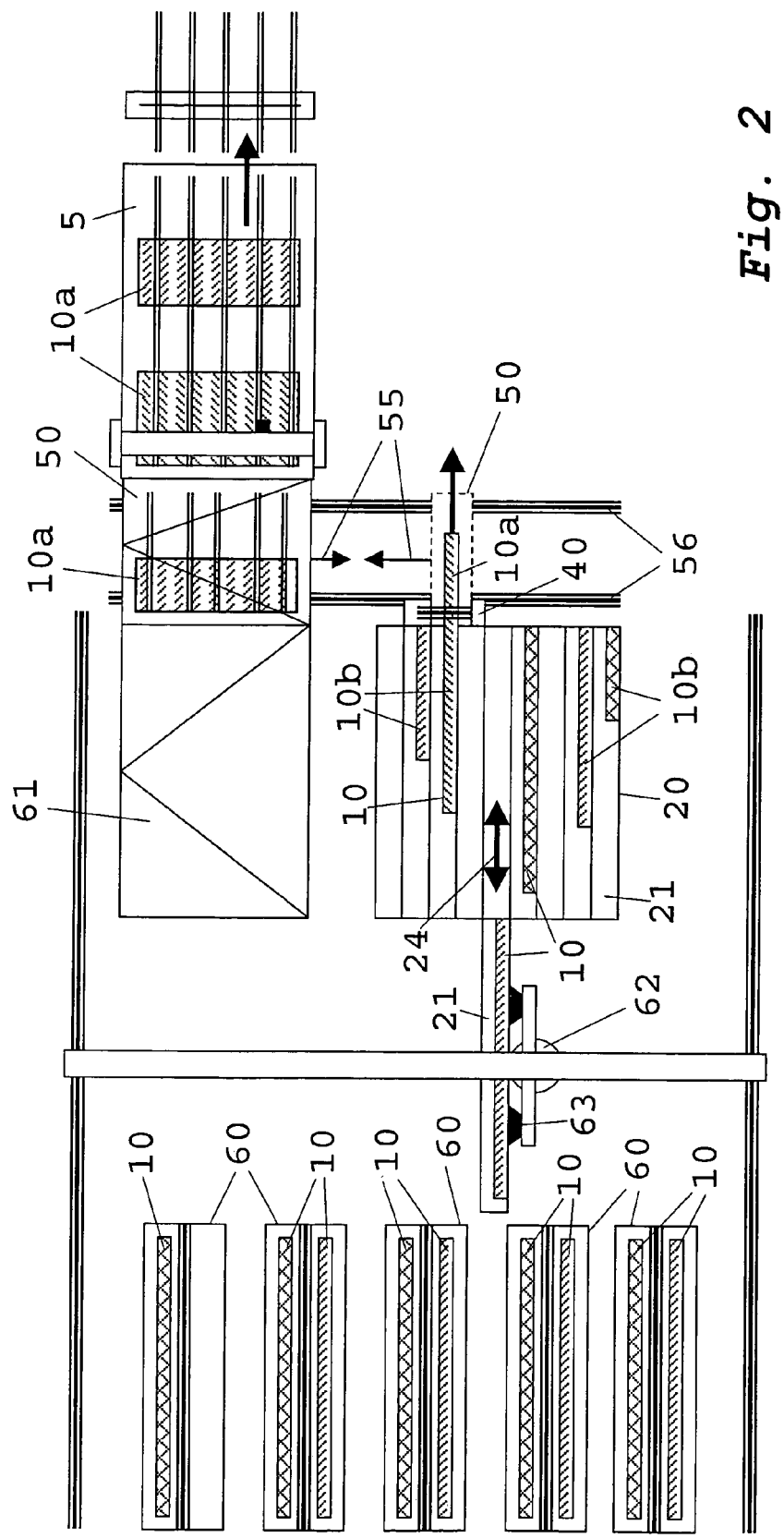
FIG. 2 shows a schematic top view of the device of FIG. 1 for feeding a horizontal glass processing installation.

In one embodiment of the loading device, a loading unit 30 is provided for loading a compartment 21 with a glass plate 10. Similarly as described above, loading unit 30 comprises an essentially vertical supporting surface 32 as well as a rest surface 33 that may e.g. include a driven conveyor belt for moving a glass plate 10 into a corresponding compartment 21. In another embodiment of the loading device, compartment 21 is laterally extensible as illustrated in FIG. 2 by double arrow 24. In order to load a compartment 21, the latter is pulled out by means of a drive such that compartment 21 is accessible from the exterior. In a further embodiment of the loading device, the width of a compartment 21 is chosen such that a glass plate from the storage space can be picked up e.g. by means of a portal crane and directly lowered into the corresponding compartment from above. In order to make the device accessible also for wider portal cranes, it is conceivable to arrange compartments 21 in a mutually displaceable manner, thereby allowing to enlarge the lateral distance to the adjacent compartment while loading a compartment 21.

As further appears in FIG. 1, a dividing device 40 is optionally provided for dividing a glass plate 10 contained in a compartment 21 into two portions 10a and 10b ("loading portion" and "residual portion", respectively) along a vertical line.("X cut"). Dividing device 40 comprises a cutting tool for providing glass plate 10 with a vertical scribing line, and a breaking device for breaking the glass plate 10. The breaking device comprises e.g. two vertical vacuum bars for retaining the glass plate 10 on one side and a vertical break bar that is adapted to press on the opposite side of glass plate 10 in order to break it. Furthermore, dividing device 40 may optionally comprise a tool for coating removal in coated glass plates ("edge deletion").

Optionally, a transfer device 50 arranged between storage unit 20 and glass processing installation 5 is provided for transferring the portion 10a of a glass plate 10 that has been cut off. Transfer device 50 is e.g. designed as a tilting table, so that the cut portion 10a may be tilted from the vertical to the horizontal position and delivered, as shown in FIG. 1, to a glass processing installation 5 in which glass plates 10a are processed in the horizontal position. Tilting table 50 further serves for adequately supporting a glass plate 10 stored in storage unit 20 during the severing operation; for which purpose it is turned to the vertical direction and moved in front of the corresponding compartment 21 of storage unit 20.

Residual glass plates that are contained in storage unit 20, but are too small for further use are transferred by the displacing means of storage unit 20 to loading unit 30 and delivered to a waste collecting location (not shown) for disposal. It is also possible to extract such residual glass plates via the other side of storage unit 20, i.e. the right side in FIG. 1, and to transport them to the waste collecting location by means of the movable transfer device 50.

Depending on the application of the loading device, storage unit 20, loading unit 30, dividing device 40, and transfer device 50 are stationary or, as represented in FIG. 1 by arrows 25, 35, 45, 55, displaceable transversally to glass processing installation 5. Thus, for example, storage unit 20 is stationary while the remaining components 30, 40, 50. are displaceable. This arrangement offers the advantage that storage unit 20, which due to the stored glass plates 10 is relatively heavy and therefore inert, need not be moved, thereby allowing a faster loading rate. Furthermore, a corresponding displacing ability of transfer device 50 allows loading additional parallel glass processing installations 5a (shown in dotted lines in FIG. 1).

FIG. 2 shows a first application of the device for loading a horizontal glass processing installation 5. Said glass processing installation is e.g. a glass cutting installation in which glass plates 10 of different sorts are to be cut to desired sizes in a desired sequence. In the example of FIG. 2, the compartments 21 of storage unit 22 can be pull out, so that a loading unit is not required. Storage unit 20 is stationary, and dividing device 40 and tilting table 50 are mutually coupled and displaceable along rails 56. Furthermore, FIG. 2 schematically shows the blank glass plates 10 that are ready in the storage space and vertically stored in racks 60. Also shown is an additional tilting table 61 that may be coupled to transfer unit 50. It is thereby possible, if required by the production sequence, to deliver an entire glass plate 10 directly to glass processing installation 5 without the need of displacing it via storage unit 20.

Loading of glass processing installation 5 is effected according to the following method:

Glass plates 10 are picked up from the storage space individually by means of a portal crane 62, which includes suction devices 63, and transferred to the corresponding compartments 21 of storage unit 20.

According to the production demands of glass processing installation 5, a corresponding glass plate 10 of the desired sort is moved out of its compartment 21 by the displacing means of storage unit 20 over such a distance that a portion of glass plate 10 of the desired length may be cut off by dividing device 40. Tilting table 61 (shown in dotted lines in FIG. 2) is tilted to the vertical position to support glass plate 10 during the dividing operation. Then, for storage in storage unit 20, the remainder 10b of glass plate 10 is pushed back some distance into compartment 21 by the displacing means.

Tilting table 50 is tilted about 90 degrees out of the vertical direction such that the cut portion 10a now assumes a horizontal position, and displaced until it is in line with glass processing installation 5, and the cut portion 10a is delivered.

The transferred portion 10a is re-positioned by means of mechanical stops and/or by optical scanning. This ensures that e.g. following cuts will be as precisely orthogonal or parallel to the previously broken edges of portion 10a as possible.

Portions 10a are cut off from glass the plates 10, 10b, which are stored in storage unit 20, and delivered to glass processing installation 5 according to the sequence and the sort of glass plates required in the production line.

If, as mentioned above, an entire glass plate is to be loaded at once, then it is directly transferred from the storage space to tilting table 61, which is tilted to the horizontal position, and delivered to glass processing installation 5 via tilting table 50.

Figure 3:
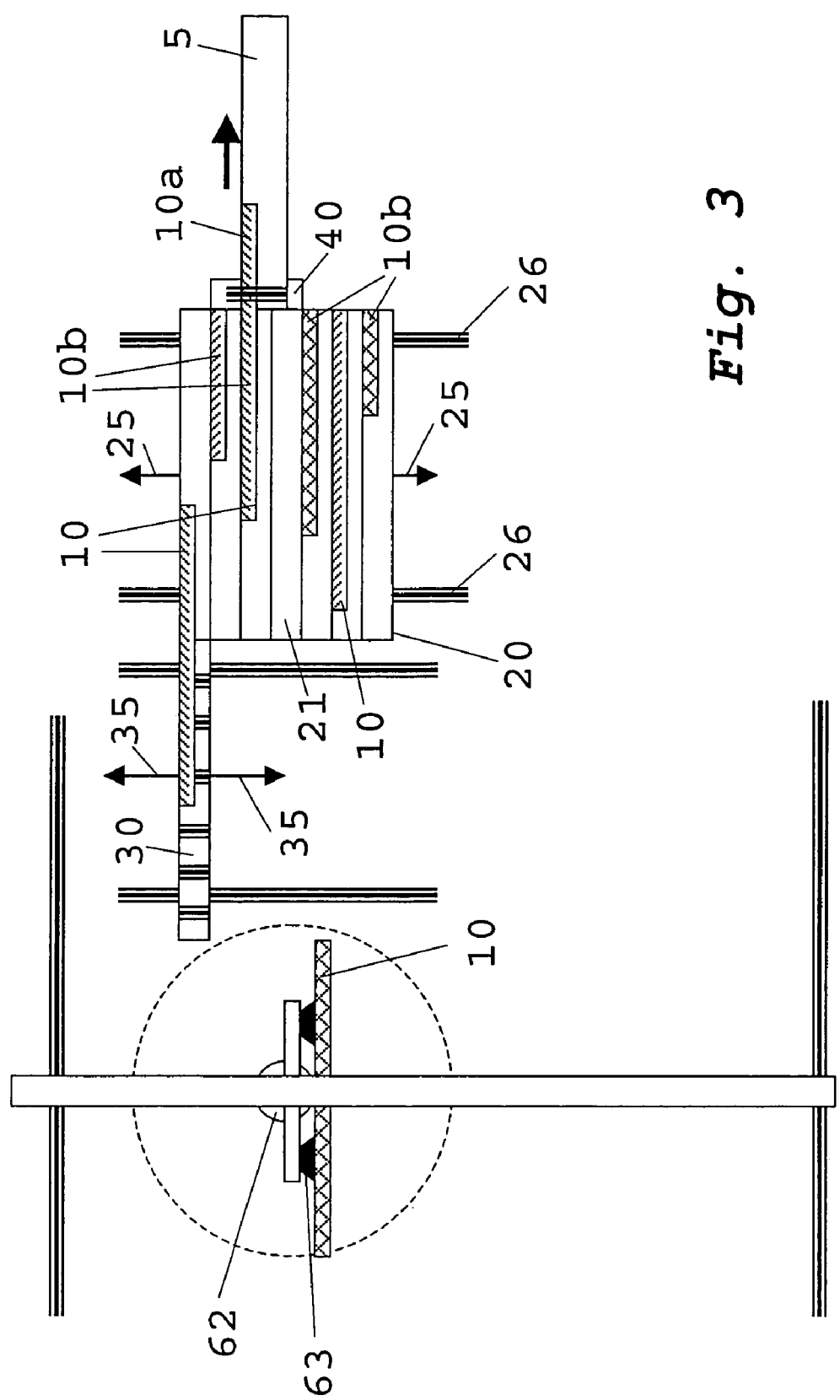
FIG. 3 shows a schematic top view of the device of FIG. 1 for feeding a vertical glass processing installation.

FIG. 3 shows another application of the device for loading a glass processing installation 5 where the glass plates 10 are cut in the vertical position. Dividing device 40 for severing a glass plate 10 along a vertical line is integrated in glass processing installation 5. In the example according to FIG. 3, storage unit 20 is movable along rails 26, so that the transfer unit may be omitted. Loading unit 30 is displaceable as well, so that the operation of loading a glass plate 10 into storage unit 20 and the transfer of a glass plate 10 to glass processing installation 5 need not to be coordinated in time. If lower rates of loading are sufficient, loading unit 30 may also be stationary, so that for loading a glass plate 10 into an empty compartment 21, storage unit 20 is displaced such that compartment 21 is in line with loading unit 30.

In order to load glass processing installation 5 with a portion 10a of a given glass plate 10, storage unit 20 is displaced such that compartment 21 containing the corresponding glass plate 10 and the vertical supporting surface of glass processing installation 5 are in line with each other. Glass plate 10 is subsequently displaced and a portion 10a of the required length thereof is cut off by means of dividing device 40 and forwarded for further processing. The glass plate remainder 10b remains in storage unit 20. According to the production requirements, further portions b1a are cut off from the glass plates 10, 10b stored in storage unit 20 and are processed.

The processing of the glass plates 10 according to FIG. 3 offers the advantage, amongst others, that they constantly remain in a vertical position, thereby allowing a space-saving operation and eliminating the need for tilting and realigning the cut portions 10a. It is also possible to supply entire glass plates 10 to glass processing installation 5 without the dividing operation.

Figure 4:
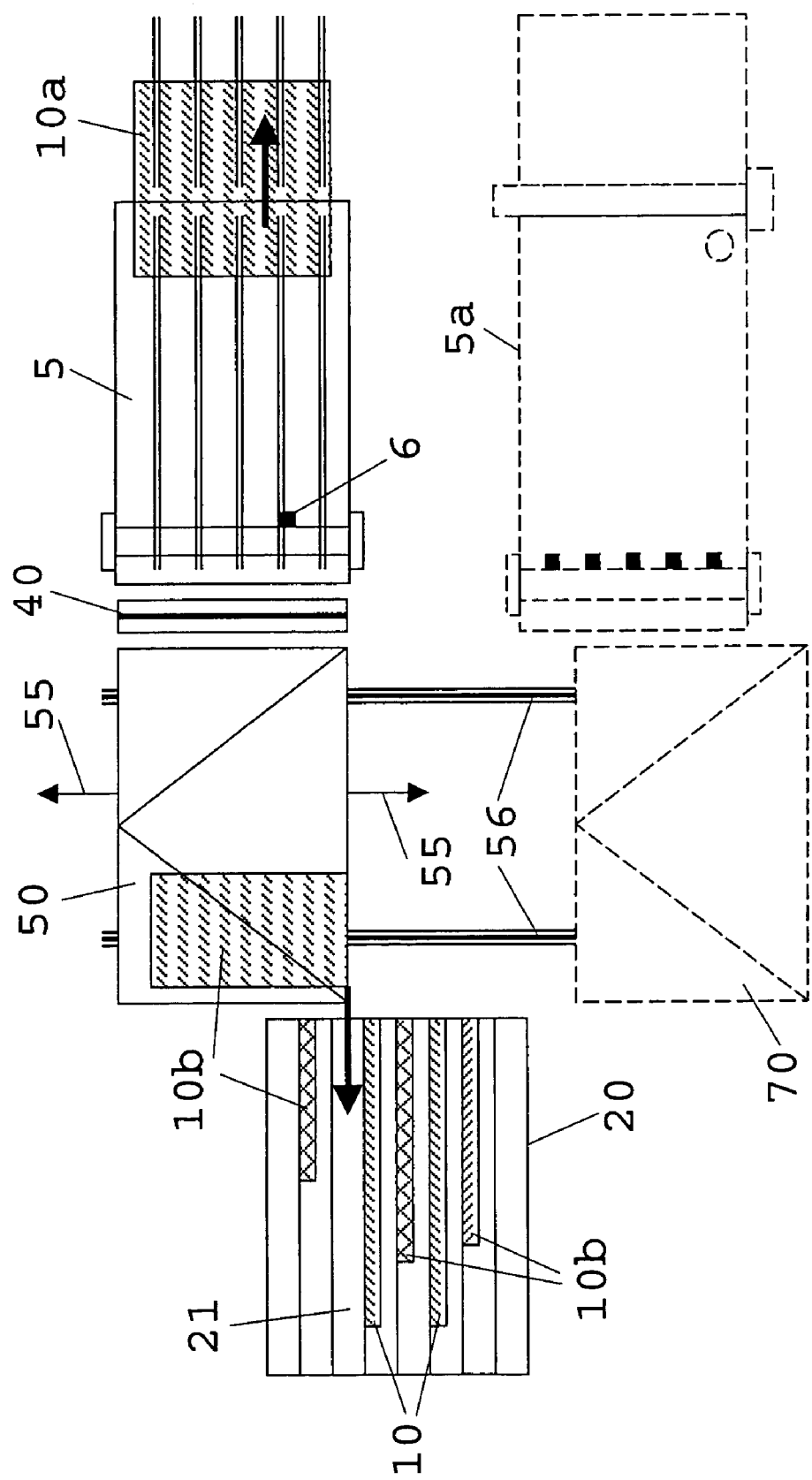
FIG. 4 shows a schematic top view of the device of FIG. 1 for feeding yet another horizontal glass processing installation.

FIG. 4 shows a further application of the device for loading a horizontal glass processing installation 5 that includes a cutting bridge with a cutting tool 6. Storage unit 20 is stationary while transfer unit 50 is in the form of a tilting table movable along rails 56. Furthermore, a dividing device 40 comprising a breaking bar for breaking operations is provided in front of glass processing installation 5. Alternatively, it is also possible to make storage unit 20 displaceable while transfer unit 50 remains stationary.

In order to load glass processing installation 5, the corresponding glass plate 10 is transferred from storage unit 20 to glass processing installation 5 via tilting table 50 and scribed by means of cutting tool 6. Subsequently, glass plate 10 is pushed back towards tilting table 50 over such a distance that it may be broken into two portions 10a and 10b along the scribing line by means of dividing device 40. The right portion 10a is then supplied to glass processing installation 5 and further processed. Remainder 10b of the glass plate is turned to the vertical position together with the tilting table and pushed back into a compartment 21 of storage unit 20.

Alternatively, as a second transfer unit, another tilting table 70 may be provided which is arranged in parallel to the first transfer device 50 and also displaceable on rails 56. It is thereby possible to load two parallel glass processing units 5 and 5a at a particularly high rate.

FIG. 5 shows a side view of the storage unit 20 described above: the compartments comprise each gliding means 27 and displacing means 28. The supporting surfaces 22 are slightly inclined with respect to the vertical for supporting the glass plates 10, 10b in a substantially vertical position. The supporting surfaces 22 are formed e.g. by plates and/or rods.

Figure 6:
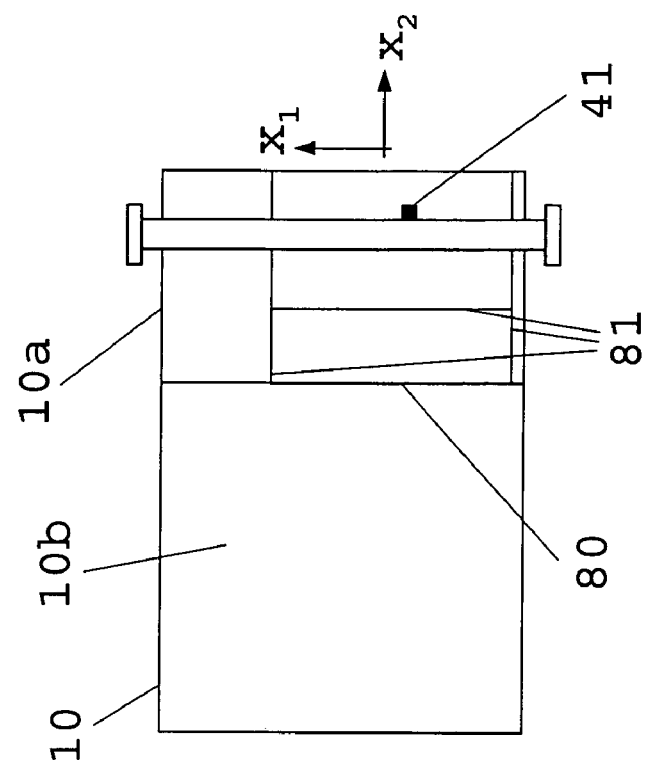
FIG. 6 shows a cutting device for scribing a glass plate.

Another embodiment of the method for loading a glass processing installation is illustrated in FIG. 6. A cutting tool 41 which is displaceable along two axes $x_1$ and $x_2$ serves for producing scribing lines 80, 81. Thus, glass plate 10 can be provided with straight scribing lines, which run e.g. horizontally or vertically, as well as with curved scribing lines. Cutting tool 41 is e.g. integrated in dividing device 40. The tool 6 according to the application of FIG. 4 corresponds to the displaceable cutting tool 41.

For loading a glass processing unit, glass plates 10 of the desired type are extracted repeatedly from storage unit 20, positioned and provided with a first scribing line 80 which runs from one edge of the glass plate 10 to another edge and, if required, with at least a second scribing line 81, wherein the glass plate 10 remains in the same position. Of course, the second scribing line 81 is not needed, if the loading portion 10a has already the desired end size and therefore does need not to be divided into smaller pieces by further processing. Preferably, while glass plate 10 is in the same position, loading portion 10a is completely scribed, so that the further processing does not require an additional scribing operation. The glass plate 10 is then divided along the first scribing line 80. The scribed loading portion 10a is moved and delivered to the glass processing installation, where it is broken along the scribing lines 81 to the desired cut pieces by means of appropriate breaking devices.

The method of scribing the glass plates at the same location allows the glass processing installation to be fed with a predetermined sequence of loading portions 10a which are already scribed. This has the advantage that the loading portions 10a moved to the glass processing installation do not need anymore to be positioned for a scribing operation, but only for a breaking operation. Thereby, cut pieces can be produced in a more accurate way, since a subsequent scribing operation would require a more precise positioning than the breaking operation. It is also advantageous that the breaking stations of the glass processing installation do not need any cutting tools for scribing the portions of the glass plates.

In addition to the advantages already mentioned, the described devices and methods offer the following benefits:

- A glass processing installation may be selectively loaded with the currently required quantity of glass. Thus, no plate remainders requiring temporary storage and management are produced within the glass processing installation, thereby eliminating the need for corresponding devices.
- The storage unit may be integrated in the storage space for glass plates, thereby allowing the glass material to be centrally stored and managed. Thus, particularly those glass materials that are not required in the current production need only be displaced to a reduced extent.
- A glass processing installation may be loaded with a plurality of different glass sorts such as plain or coated glasses, composite glasses, etc. in a simple manner.
- Glass plates of the desired length and kind may be delivered to a glass processing installation in a determinable sequence, thereby enabling an optimal production flow for the manufacture of various products (such as insulating glass panes, safety glass panes, etc.). Furthermore, the manufacture of small product series is facilitated.
- The glass plates in the storage unit are only minimally displaced when divided. After the dividing operation, the remainder of the glass plate remains in the same position essentially. This simplified handling reduces the risk of potential damage of the glass plate. Furthermore, the loading rate of a glass processing installation may be increased.
- The loading device is suitable for both horizontal and vertical processing of glass plates. An existing glass processing installation may be equipped with the loading device without major complications.
- Since the loading device, seen in the direction of the material flow, is arranged in front of the glass processing installation, the management of the glass plates within the glass processing installation is substantially simplified. Simpler devices may be used for intermediate storage and sorting of the glass plates within the glass processing installation. Loading of the storage unit and unloading at the end of the glass processing installation are uncoupled from each other, so that the throughput of the glass processing installation is easier to determine.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for loading a glass processing installation, wherein glass plates are stored in a storage unit, the method comprising the following steps:
   step a) extracting at least partially a glass plate from the storage unit; and
   step b) dividing the glass plate into a residual portion, which is stored in the storage unit, and a loading portion, which is delivered to the glass processing installation;
   wherein step a) and step b) are repeated such that glass plates are extracted from the storage unit and loading portions are delivered to the glass processing installation in a predetermined sequence, and
   wherein at least one glass plate, from which a loading portion is separated, is provided with at least two different scribing lines before performing step b), said loading portion being completely scribed before performing step b), such that the loading portion, after severing and delivering to the glass processing installation, is adapted to be divided into desired portions without another scribing operation, and wherein only the loading portion is completely scribed, the residual portion remains unscribed.

2. The method of claim 1, wherein the glass plates are stored in the storage unit in an essentially vertical position.

3. The method of claim 1, wherein in step a) the glass plate is only partially extracted from the storage unit such that for dividing the glass plate the residual portion is supported by the storage unit.

4. The method of claim 1, wherein the glass plate, while being divided according to step b), is in an essentially vertical position, and wherein
   the loading portion is displaced in a translational manner or tilted to an essentially horizontal position or both for its delivery to the glass processing installation.

5. The method of claim 1, wherein the glass plate, while being divided according to step b), is supported at least partially by a supporting surface of the glass processing installation and divided by a dividing device of the glass processing installation.

6. The method of claim 1, wherein in step a the glass plate is completely pulled out of the storage unit and wherein the residual portion of the glass plate is moved back into the storage unit after dividing it according to step b).

7. The method of claim 1, wherein the glass plates are withdrawn from a storage space and delivered to the storage unit by translational displacement such that they essentially remain in the same position during the displacement.

8. The method of claim 1, wherein the loading portion is re-positioned after delivery to the glass processing installation by means of mechanical stops or by optical scanning or both.

9. The method of claim 1, wherein in step a the glass plate is displaced only partially to a displaceable tilting table, such that in step b) the loading portion is supported by the tilting table, and wherein the loading portion is delivered to the glass processing unit by tilting and displacing the tilting table.

10. The method of claim 1, further comprising the steps of extracting a glass plate from the storage unit, and delivering the glass plate to the glass processing installation without dividing the glass plate into a residual portion and loading portion.

11. The method of claim 1, wherein the two different scribing lines extend in different directions.

12. The method of claim 1, wherein the storage unit is adapted to receive or discharge glass plates on two opposite sides.

13. The method of claim 1, wherein the storage unit is displaceable transversally to the glass processing installation.

14. The method of claim 1, wherein the storage unit comprises compartments with a supporting surface, the angle between the supporting surface and a vertical direction is in a range of 0 to 10 degrees.

15. The method of claim 1, wherein the storage unit comprises compartments with a supporting surface; the supporting surface is positioned in an essentially vertical position, the supporting surface includes gliding means for allowing a glass plate to glide along the supporting surface.

16. The method of claim 1, wherein the storage unit comprises compartments with a rest surface, the rest surface includes a driven conveyor belt.

17. The method of claim 1, wherein the storage unit comprises compartments that are laterally extensible such that the compartments are capable of being pulled out.

18. The method of claim 1, wherein the storage unit comprises compartments that are configured to be mutually displaceable to enlarge a lateral distance between adjacent compartments.

19. The method of claim 1, wherein the glass plates are stored in the storage unit in an essentially vertical position, and wherein the glass to be divided is completely pulled out of the storage unit and moved to a horizontal position for scribing the glass plate and dividing it into the loading and residual portion.

20. The method of claim 1, wherein the glass plate is divided by a vacuum bar for retaining the glass plate on one side and a vertical break bar adapted to press on an opposite side of the glass plate.

* * * * *